June 17, 1930.  G. L. BAKER  1,763,942
VALVE
Filed Sept. 19, 1927   3 Sheets-Sheet 1
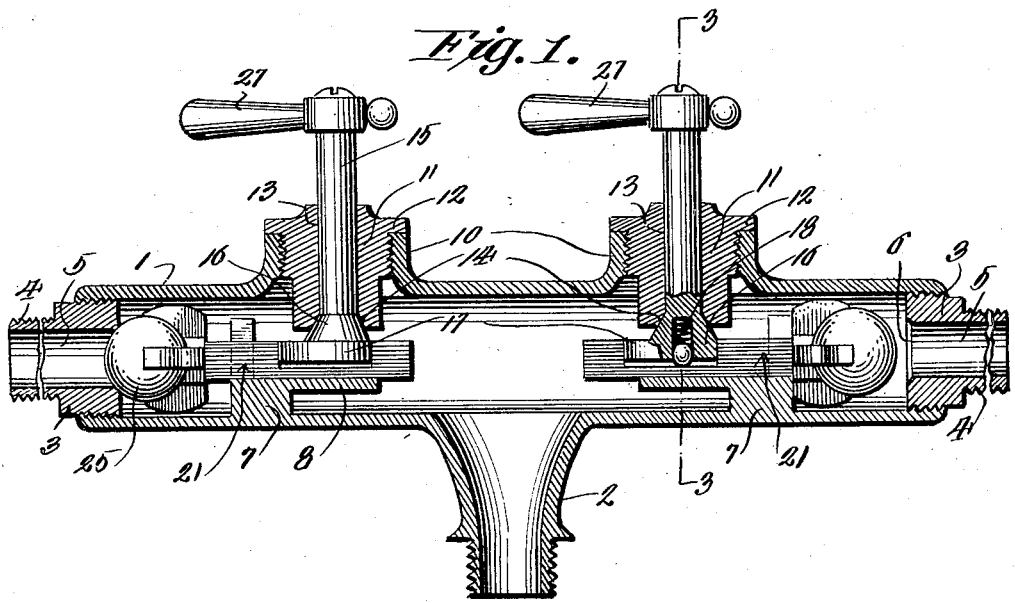
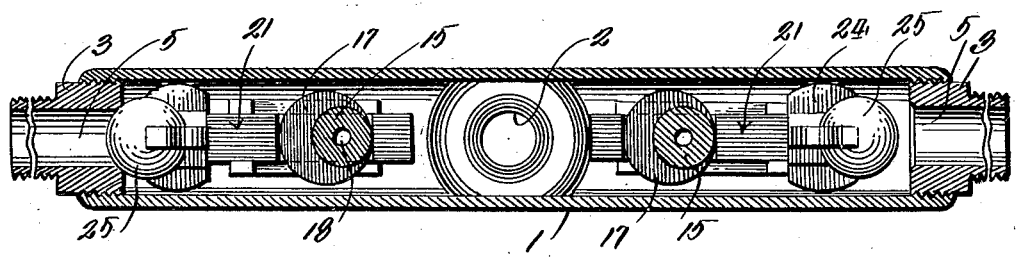
WITNESSES
Inventor
GILBERT L. BAKER
By Richard B. Owen
Attorney June 17, 1930.   G. L. BAKER   1,763,942
VALVE
Filed Sept. 19, 1927   3 Sheets-Sheet 2
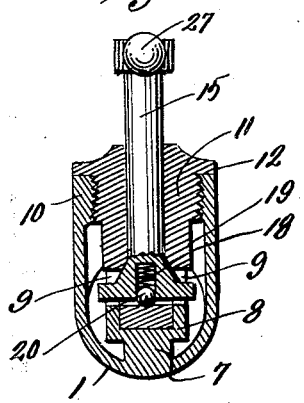
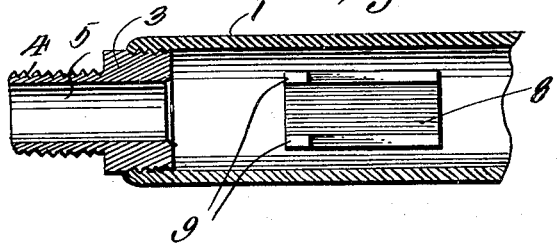
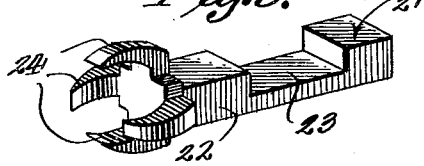
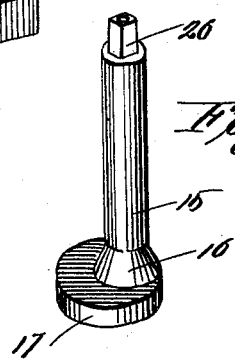
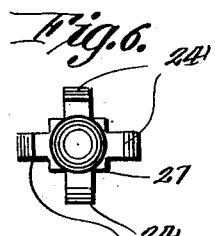
Inventor
GILBERT L. BAKER

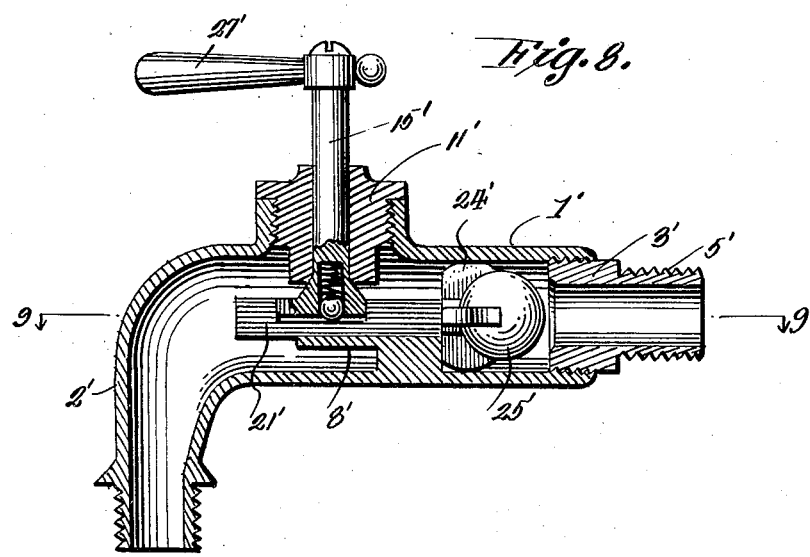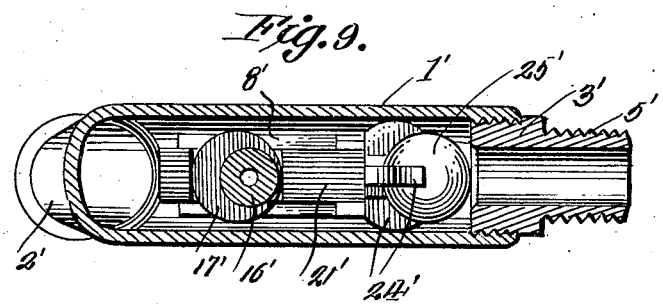

Patented June 17, 1930

1,763,942

UNITED STATES PATENT OFFICE

GILBERT L. BAKER, OF OAKLAND, CALIFORNIA, ASSIGNOR TO WILLIAM P. GRANT, OF BERKELEY, CALIFORNIA

VALVE

Application filed September 19, 1927. Serial No. 220,612.

This invention relates to the class of valves and pertains particularly to a reciprocating faucet valve.

The primary object of this invention is to provide, a washerless leak-proof valve which will be positive and unfailing in its action.

Another object of the invention is to provide, in a manner as hereinafter set forth, a valve structure employing a horizontally reciprocable valve ball and means for actuating the same.

Still another object of the invention is to provide, in a manner as hereinafter set forth, a means for maintaining a leak-proof engagement between a valve actuating stem and its surrounding structure without the employment of washers or packing.

A further and final object of the invention is to provide a valve of the above described character employing few moving parts, strong and durable and comparatively inexpensive to manufacture.

Numerous other objects and advantages of the invention will become apparent as the description of the same proceeds and the invention will be best understood from a consideration of the following detailed description taken in connection with the accompanying drawings forming a part of this specification with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a longitudinal sectional view of a two-way valve of the character embodying this invention.

Figure 2 is a transverse section taken longitudinally of the structure shown in Fig. 1.

Figure 3 is a section taken substantially upon the line 3—3 of Figure 1.

Figure 4 is a section of one end of the structure similar to the section shown in Figure 2, with the movable parts removed.

Figure 5 is a detailed perspective view of the valve ball carrying element.

Figure 6 is a view in front elevation of the structure shown in Figure 5.

Figure 7 is a detailed perspective view of a valve stem and operating cam formed integral therewith.

Figure 8 is a vertical central longitudinal section of a single faucet of the character embodying this invention.

Figure 9 is a horizontal section taken upon the line 9—9 of Figure 8.

Referring now to the drawings in detail wherein like numerals of reference indicate corresponding parts throughout the several views, the numeral 1 indicates a casing body here shown as adapted to receive a pair of valve structures for bringing together the outlet ends of two pipe lines, as for example, a hot and cold water line, a central discharge nozzle 2 opening from the casing intermediate its ends as shown, for the discharge of water from either or both of the lines. Each end of the casing is interiorly threaded to receive a nipple body 3 having the reduced threaded extension 4 for the attachment of a pipe line and having the usual longitudinal passage therethrough as indicated at 5 to permit fluid to pass into the casing body 1. The inner end edge of the passage or inlet 5 is beveled as indicated at 6 to set up a seat for a ball valve.

While the drawings show a casing designed to connect between two pipe lines for the discharge of water from either or both therethrough, it is of course, to be understood that a casing may be employed for the reception of a single valve structure only for controlling the passage of the fluid from one pipe line to the discharge nozzle 2. With this in mind, the description will cover the double or two purpose valve shown.

In each end of the casing 1, a bracket or lug 7 is formed for the support of an elongated channeled guide member 8 which extends longitudinally of the casing as shown and has at the outer end upon each side the upstanding arms 9. As will be readily seen from reference to Figure 3, this channeled member 8 is of substantially U-shaped cross section and the outer end of this member is located inwardly of the adjacent end of the casing or substantially midway between the end of the casing and the discharge nozzle. The casing 1, over each of the guide members 8 is formed to set up the outwardly extending internally threaded collar or sleeve 10.

In each collar 10 there is threadedly engaged a sleeve plug 11, the upper portion of which is formed to set up the surrounding flange 12 which bears against the top edge of the associate collar 10. Each sleeve plug 11 has a central longitudinal bore 13 formed therethrough and the wall surrounding lower end edge of the bore is beveled as indicated at 14 to form a seat for a rotating body, about to be described.

Positioned in the bore 13 of each of the plugs 11 is a valve actuating stem 15, the lower end of which has a frusto-conical body 16 formed thereon, the wall of which body is designed to bear against the beveled surface or seat 14.

Formed integral with the base of the body 16 is a cam body 17 and formed in the under side of the cam body and extending into the center of the body 16 is a passage 18 designed to receive an expansion spring 19 and a bearing ball 20 at the outer end thereof. Slidably mounted in the channeled member 8 is a ball valve carrying unit indicated generally by the numeral 21, which unit comprises a bar 22 which is formed to fit into the channel member 8. Intermediate the ends of this bar is formed in the top surface the cam slot 23 while the forward end of the bar carries a plurality of forwardly directed claw members 24 each of which extends from one side edge of the member, as is clearly shown in Figure 5. The body 21 is slidably mounted in the guide member 8, with the claws directed toward the adjacent body 3. Carried by the claws is a valve ball 25 which, when the body 21 is moved forwardly, is designed to partially enter the bore or inlet 5 of the adjacent body 3 to seat upon the beveled edge 6 of the bore, thus completely closing the same.

With the body 21 in the position described, the cam 17 carried by the valve stem 15 positions in the slot 23 and when the sleeve plug 11 is threaded into the collar 10 the lower end of the plug bearing against the body 16 of the valve stem will force the cam downwardly against the tension of the spring 18 which is acting to force the ball 20 against the bottom of the slot. This ball 20 and spring normally act to maintain a leak-proof connection between the beveled surface 14 of the sleeve plug and the surface of the body 16 of the valve stem.

The upper end of the valve stem is reduced as indicated at 26, Figure 7, to receive thereon the usual handle member 27.

From the foregoing description it will be readily seen that upon turning the valve stem 15 the cam body 17 controlled thereby will act upon the front or rear wall of the slot 23 to reciprocate the body 21 and thus move the ball 25 to opened or closed position.

In Figures 8 and 9 a single faucet is shown employing the valve structure described in connection with the preceding figures and as will be seen the structure in the single faucet is the same as the double faucet, the main body or casing being indicated by the numeral 1' and having the discharge nozzle 2'.

In the end of the casing 1' the nipple 3' is inserted, through which a bore is formed and this has the outer portion reduced and threaded as indicated at 5'.

Within the casing there is positioned the longitudinally extending channelled guide member 8' which supports the ball valve carrying unit 21', one end of which is provided with the claws 24' which carry or support in position the ball valve 25'.

The centrally bored plug 11' which passes through the casing 1' has the stem 15' extending therethrough, the lower end of which stem is formed to provide the cam 17' which coacts with the unit 21' in the same manner as in the double spigot structure. The upper end of the stem 15' carries the handle 27' by means of which it is rotated to cause reciprocation of the ball valve unit 21'.

From the foregoing brief description of figures 8 and 9 it will be readily seen that the single faucet operates in the same manner as the double faucet and therefore further detailed description of the same is believed unnecessary.

Having thus described my invention, what I claim is:

1. A valve structure of the character set forth, comprising a tubular casing having an inlet and an outlet, means to set up a valve seat at said inlet, a channeled shaped body mounted longitudinally within said casing, an elongated body arranged for sliding movement in said channeled body, a valve ball carried at one end of said elongated body for co-action with said valve seat, and means for shifting the said elongated body.

2. A valve structure of the character set forth, comprising a tubular casing having an inlet and an outlet, means to set up a valve seat at said inlet, a channel shaped body mounted longitudinally within said casing, an elongated body arranged for sliding movement in said channeled body and having a recess in the upper surface thereof, a valve ball carried at one end of said elongated body for co-action with said valve seat, a valve actuating stem, and a cam member at the inner end of said stem designed to engage in said body recess, to shift the body upon rotation of the stem.

3. A valve structure of the character set forth, comprising a tubular casing having an inlet and an outlet, means to set up a valve seat at said inlet, a channel shaped body mounted longitudinally within said casing, an elongated body arranged for sliding movement in said channeled body and having a recess in the upper surface thereof, a sleeve surrounding an opening in said casing, a plug threaded into said sleeve and having a central bore therethrough, a valve stem extending through said bore into the casing, a cam member formed at the inner end of said stem and engaging in said body recess, to shift the body upon rotation of the stem, and a valve ball at one end of said elongated body for engagement with said valve seat, to open or close said inlet opening upon the shifting of the body.

4. A valve structure of the character set forth, comprising a tubular casing having an inlet and an outlet, means to set up a valve seat at said inlet, a channel shaped body mounted longitudinally within said casing, an elongated body arranged for sliding movement in said channeled body and having a recess in the upper surface thereof, a sleeve surrounding an opening in said casing, a plug threaded into said sleeve and having a central bore therethrough, a valve stem extending through said bore into the casing, a cam member formed at the inner end of said stem and engaging in said body recess, to shift the body upon rotation of the stem, a valve ball at one end of said elongated body for engagement with said valve seat, to open or close said inlet opening upon the shifting of the body, and means engaging between said cam member and the lower surface of said recess for forcing said stem upwardly to set up a leak-proof engagement between the stem and the surrounding plug.

5. A valve structure comprising a horizontally arranged casing having inlet and outlet ports and a valve seat, a body arranged within the casing, means supporting the body above the lower side of the casing for sliding movement longitudinally of the casing, members at one end of the body, a ball valve arranged in said members and supported thereby out of contact with the casing, a vertical stem journaled in the casing, and elements on the body and the stem and adapted to coact to effect the shifting of the body during the turning of the stem.

6. A valve structure comprising a casing having inlet and outlet ports and a valve seat, a body mounted in the casing for sliding movement longitudinally thereof, a valve carried by the body, a stem journaled in the casing at right angles to the body, elements on the body and stem adapted to co-act to shift the body on the turning of the stem, the casing being provided with an inclined seat surrounding the stem and the stem being provided with a recess opening out through the inner end thereof, an inclined shoulder formed on the stem and contacting with said inclined seat, an anti-friction member arranged in said recess and contacting with the body, and a spring arranged in said recess and contacting with the stem and anti-friction member to hold the inclined shoulder against the inclined seat.

In testimony whereof I affix my signature.

GILBERT L. BAKER.